Feb. 16, 1926.
C. J. COBERLY
1,573,301
METHOD OF AND APPARATUS FOR CUTTING WIDE SLOTS
Filed Jan. 5, 1925
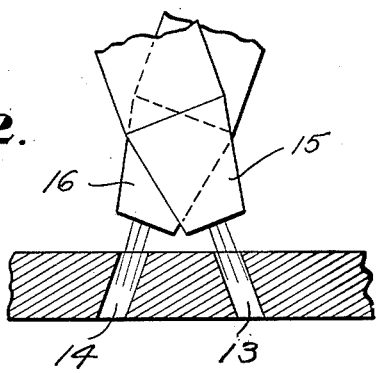
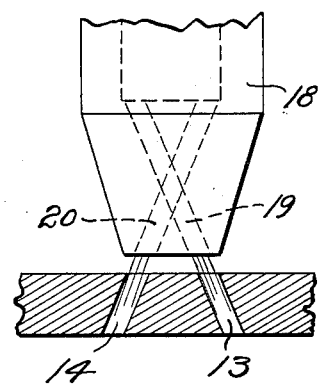
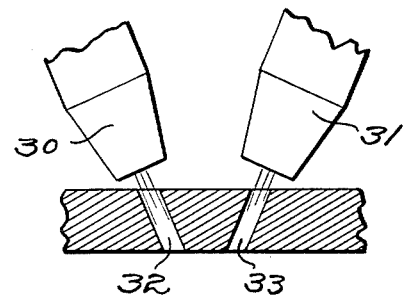
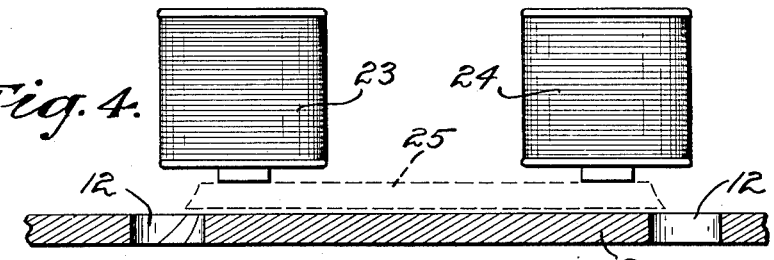
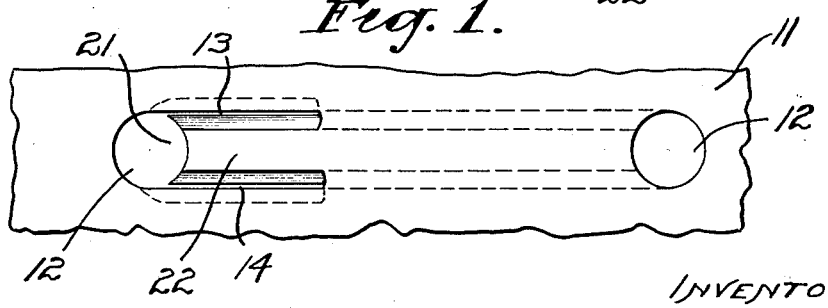
INVENTOR:
CLARENCE J. COBERLY.
By
ATTORNEY.

Patented Feb. 16, 1926.

1,573,301

UNITED STATES PATENT OFFICE.

CLARENCE J. COBERLY, OF LOS ANGELES, CALIFORNIA, ASSIGNOR TO KOBE, INC., OF LOS ANGELES, CALIFORNIA, A CORPORATION OF CALIFORNIA.

METHOD OF AND APPARATUS FOR CUTTING WIDE SLOTS.

Application filed January 5, 1925. Serial No. 735.

*To all whom it may concern:*

Be it known that I, CLARENCE J. COBERLY, a citizen of the United States, residing at Los Angeles, in the county of Los Angeles and State of California, have invented a new and useful Method of and Apparatus for Cutting Wide Slots, of which the following is a specification.

This invention relates to a method of and apparatus for cutting wide slots in a sheet of metal.

It is an object of this invention to provide a method for more accurately and more economically cutting wide slots than is now possible. At present, for cutting wide slots in a sheet of metal, a very heavy torch is used because much metal must be burned away. A torch of a large size, which must be used, consumes considerable fuel and is expensive in this respect. The walls of slots cut by a heavy torch are not very smooth owing to the fact that the torch must be moved very slowly along the sheet in which the slot is being cut, since it is necessary to remove so much metal and because the formation of slag tends to impede the progress of the cut. My method of producing wide slots comprehends the providing of orifices in the sheet of metal which are spaced and represent the length of the slot to be cut. Comparatively small cutting torches are employed for cutting a pair of narrow parallel slots which connect these orifices together. I thus form a central core which is circumscribed by the orifices and the parallel extending slots. The small torches can be used because only a comparatively small amount of metal is burned away, these torches being very much cheaper to operate than the larger torches. The walls of the slot are accurate and smooth because the torch may be moved at a greater rate of speed than the large torches, and the flame will not cause irregularities in the walls of the slot.

It is another object of the invention to provide a method for producing a slot of keystone shape. With the present equipment an extra operation is necessary to cut the walls at an angle with respect to each other, a parallel walled slot being first cut, after which these walls are given angular relationships by an extra cutting operation. In my method it is possible to tilt the torches at an angle with respect to each other so that the two parallel extending slots are provided at angles relative to each other and the wide slot finally produced will be of keystone shape.

It is a still further object of the invention to provide a method for cutting slots which includes the removing of the central core. For example, when slots are being cut in pipe, if they are allowed to fall inside of the pipe, they must be subsequently removed. The slag formed during the cutting of the slots causes a tendency of the cores to stick to the interior of the pipe and the removing of these cores is sometimes difficult. In my invention I provide a means preferably in the form of a magnet for lifting the core from place as the slot is completed.

It is another object of the invention to provide an apparatus for the carrying out of the above-mentioned method.

Other objects and advantages of the invention will be made evident hereinafter.

Referring to the drawing which is for illustrative purposes only,

Fig. 1 is a view of a plate showing the manner in which the starting orifices are provided in a sheet of metal.

Fig. 2 is a view illustrating one torch arrangement for producing slots for connecting the starting orifices together, this view showing the employment of a pair of torches.

Fig. 3 is a view showing the manner in which the connecting slots may be provided by the use of a single torch.

Fig. 4 is a longitudinal sectional view through a slot provided by my method, which illustrates the electromagnetic equipment for removing the core when the slot is completed.

Fig. 5 is a view illustrating the manner in which another design of slot may be provided.

As shown in the drawings, 11 is a sheet of metal in which are provided starting openings 12. These starting openings 12 are of a diameter which is equal to the width of the slot to be cut and which are spaced apart a distance equal to the length of the slot to be cut. These starting openings 12 may be provided in any suitable manner as by stamping or drilling. After the starting openings 12 are produced, they are joined together by a pair of slots 13 and 14, as shown in Figs. 1 to 4 inclusive. I produce these slots 13 and 14 preferably by using a cutting torch or a pair of cutting torches.

In Fig. 2 I show cutting torches 15 and 16 employed for producing the slots 13 and 14. These torches are arranged in angular relationship so that the narrow slots 13 and 14 will be in angular relationship. By so cutting the slots, I am able to produce a final wide slot which is keystone in shape, and which is very desirable for some purposes. As an example, of the use of keystone slots, screen casing used in the oil industry is provided with slots through which the oil enters the casing of the well. These slots in their preferred form are keystone shaped so as to relieve the outer face of the slot and thereby reduce the danger of particles of sand clogging the slots to a minimum. The torches 15 and 16 are first disposed over the left hand opening 12 and are moved in a direction toward the right hand opening 12. This connects the pair of openings 12 together by means of a pair of parallel and relatively spaced slots 13 and 14.

In Fig. 3 I show the use of a single torch 18 for producing the slots 13 and 14. The torch 18 may be provided with a pair of passages 19 and 20 which are arranged at angles relative to each other. This directs a pair of cutting streams at angles and accomplishes the producing of angularly disposed slots 13 and 14 in substantially the same manner as do the torches 15 and 16. It is possible to use a single torch 18 where the slot is not extremely wide. However, where an extremely wide slot is desired, it is preferable to use a pair of torches.

When the openings 12 are joined together by narrow slots 13 and 14, a central core 22 is thereby formed. In some cases it is not detrimental to allow the core 22 to drop from place. However, in other cases, this may be very undesirable and I, therefore, provide means for removing the core 22 at the completion of the wide slot. As shown in Fig. 4 I provide this means in the form of electromagnets 23 and 24 which may be conveniently arranged above the wide slot 21. The electromagnets 23 and 24 are energized and when the slots 13 and 14 are finished, that is, when the openings 12 are connected together, the magnets 23 and 24 are effective in raising the core 22 from place, drawing the core upward, as indicated, into the dotted line position 25 of Fig. 4.

The above described method is extremely economical, as compared with the previous methods which employ a large torch and burn away the entire metal. In my method, I cut away only a small portion of the metal and provide a slot much cheaper than is possible at the present time. By my method I am able to produce keystone or wedge-shaped slots which are very useful in various arts.

In Fig. 5 I illustrate my method for cutting a wedge-shaped slot having the narrower face thereof remote from the torches in place of adjacent thereto. This is accomplished merely by arranging torches 30 and 31 so that the flames thereof converge rather than diverge relative to each other. This is effective in producing slots 32 and 33 which are extended, as shown in the drawings.

Although I illustrated my invention as cutting wedge-shaped slots, it is obvious that my invention is valuable for cutting parallel walled slots or any other shape of slot. One importance of my invention resides in the fact that it is more economical in producing slots than the present apparatus. It will produce a more accurate slot, and will produce slots at a faster rate than the present apparatus. The feature of removing the cores 22 as the slot 21 is produced is likewise a valuable feature of my invention, owing to the fact that it saves time by eliminating a subsequent operation.

I claim as my invention:

1. The method of cutting a slot in a sheet of metal, comprising; mechanically forming holes through said metal at points on opposite ends of the proposed slot; and simultaneously burning between said holes a pair of parallel slots.

2. The method of cutting a slot in a sheet of metal, comprising: mechanically forming holes through said metal at points on opposite ends of the proposed slot; and simultaneously burning between said holes a pair of parallel slots, said parallel slots being considerably less in width than said proposed slot when completed.

3. The method of cutting a slot in a sheet of metal, comprising: mechanically forming holes through said metal at points on opposite ends of the proposed slot; simultaneously burning between said holes a pair of relatively spaced narrow slots, thereby forming a core within said holes and burnt slots; and removing said core.

4. The method of cutting a slot in a sheet of metal, comprising: mechanically forming holes through said metal at points on opposite ends of the proposed slot; simultaneously burning between said holes a pair of relatively spaced narrow slots, thereby forming a core within said holes and burnt slots; and magnetically removing said core.

5. The method of cutting a slot, key-stone shaped in cross section, in sheet metal, comprising: mechanically forming holes through said metal at points on opposite ends of the proposed key-stone slot; and simultaneously burning between said holes a pair of parallel slots oppositely inclined through the cross section of said metal.

6. The method of cutting a slot, keystone in cross section, in sheet metal comprising: mechanically forming holes through said metal at points on opposite ends of the proposed key-stone slot; and simultaneously burning between said holes a pair of parallel slots oppositely inclined through the cross section of said metal so that a core is formed within said holes and burnt slots.

7. The method of cutting a slot, key-stone in cross section, in sheet metal comprising: mechanically forming holes through said metal at points on opposite ends of the proposed key-stone slot; simultaneously burning between said holes a pair of parallel slots oppositely inclined through the cross section of said metal so that a core is formed within said holes and burnt slots; and magnetically removing said core.

8. The method of cutting a slot in a sheet of metal, comprising: mechanically forming holes through said metal at points on opposite ends of the proposed slot; and simultaneously in the same direction burning between said holes a pair of relatively spaced slots.

9. The method of cutting a slot in a sheet of metal, comprising: mechanically forming relatively spaced holes in said sheet of metal; burning relatively spaced slots in said sheet, said slots joining said holes together and forming a central core; and removing said core.

10. The method of cutting a slot in a sheet of metal, comprising: mechanically forming relatively spaced holes in said sheet of metal; burning relatively spaced slots in said sheet, said slots joining said holes together and forming a central core; and magnetically removing said core.

11. The method of cutting a slot in a sheet of metal, comprising: mechanically forming relatively spaced holes in said sheet of metal; burning simultaneously and in the same direction relatively spaced slots in said sheet, said slots joining said holes together and forming a central core; and magnetically removing said core.

In testimony whereof, I have hereunto set my hand at Los Angeles, California, this 30th day of December, 1924.

CLARENCE J. COBERLY.